US009621453B1

United States Patent
Pani et al.

(10) Patent No.: US 9,621,453 B1
(45) Date of Patent: Apr. 11, 2017

(54) PATH DISCOVERY IN MULTIPATH NETWORKS

(71) Applicant: Google Inc., Mountain View, CA (US)

(72) Inventors: Ayaskant Pani, Freemont, CA (US); Shashidhar Rao Gandham, Fremont, CA (US)

(73) Assignee: Google Inc., Mountain View, CA (US)

( * ) Notice: Subject to any disclaimer, the term of this patent is extended or adjusted under 35 U.S.C. 154(b) by 136 days.

(21) Appl. No.: 14/013,773

(22) Filed: Aug. 29, 2013

(51) Int. Cl.
| | |
|---|---|
| H04L 12/70 | (2013.01) |
| H04L 12/751 | (2013.01) |
| G06F 15/173 | (2006.01) |
| H04L 12/707 | (2013.01) |

(52) U.S. Cl.
CPC .................................. H04L 45/24 (2013.01)

(58) Field of Classification Search
CPC ......... H04L 45/24; H04L 12/70; H04L 45/02; H04L 12/751; H04L 12/26; H04L 43/10; H04L 45/22; H04L 43/0829; H04L 45/70; G06F 15/173
USPC ........................................................ 370/389
See application file for complete search history.

(56) References Cited

U.S. PATENT DOCUMENTS

| | | | |
|---|---|---|---|
| 8,724,494 B2 | 5/2014 | Uppalli et al. | |
| 9,055,000 B1 | 6/2015 | Ghosh et al. | |
| 2007/0011319 A1* | 1/2007 | McClure | G02B 6/105 |
| | | | 709/224 |
| 2008/0219272 A1* | 9/2008 | Novello et al. | 370/401 |
| 2011/0032833 A1* | 2/2011 | Zhang | H04L 45/70 |
| | | | 370/252 |
| 2012/0014261 A1* | 1/2012 | Salam | H04L 43/0811 |
| | | | 370/242 |
| 2012/0303835 A1* | 11/2012 | Kempf et al. | 709/235 |
| 2013/0128751 A1 | 5/2013 | Keesara et al. | |
| 2013/0250770 A1* | 9/2013 | Zou | H04L 47/19 |
| | | | 370/238 |
| 2013/0266007 A1* | 10/2013 | Kumbhare et al. | 370/389 |
| 2013/0329601 A1* | 12/2013 | Yin | H04L 45/02 |
| | | | 370/254 |
| 2014/0029449 A1* | 1/2014 | Xu | H04L 43/10 |
| | | | 370/252 |
| 2015/0029872 A1* | 1/2015 | Pignataro | H04L 43/10 |
| | | | 370/252 |

* cited by examiner

*Primary Examiner* — Edan Orgad
*Assistant Examiner* — Vanneilian Lalchinthang
(74) *Attorney, Agent, or Firm* — McDermott Will & Emery LLP (57) ABSTRACT

Exemplary embodiments identify all viable paths in an ECMP/WCMP enabled network without running traceroute multiple times. Devices in a network may be configured to send a packet including a pre-determined option to an Software-Defined Network Controller (SDNC) upon receipt. If a destination of the packet is within the SDNC-controlled domain, SDNC identifies all viable ECMP/WCMP paths using routing information of the network. If the destination of the packet is outside the SDNC-controlled domain, SDNC identifies at least one egress switch of the SDNC-controlled domain. SDNC may identify internal paths connecting the source of the packet to the at least one egress switch. SDNC may also identify external paths connecting the at least one egress switch to the destination of the packet. SDNC may construct the viable ECMP/WCMP paths by connecting the internal paths to the external paths.

18 Claims, 5 Drawing Sheets

PATH DISCOVERY IN MULTIPATH NETWORKS

BACKGROUND

In a conventional network, there may be multiple paths to transport data packets between a source and a destination in the network. The network may be configured to split the traffic among these multiple paths. In a network that deploys Weighted Cost Multi Path (WCMP) routing, the traffic may be distributed among available paths based on a set of pre-determined routing ratios, i.e. costs. If the pre-determined ratios are equal, the routing is Equal Cost Multi Path (ECMP) routing, where the traffic is distributed evenly among the available paths.

Conventional datacenter deployments may employ multiple ECMP routing between various hosts. At each leg of the path between a source and destination pair, there may potentially exist multiple next hop neighbors with the same cost to the destination. In conventional networks, the forwarding link is selected based on hashing of various packet header information such as source IP address, destination IP address, protocol type, source port number, destination port number, etc. As a result, traffic from multiple applications on the same source-to-destination machines may traverse different paths.

Traceroute is a networking tool that helps to identify all the paths between a given source and destination pair. Traceroute also measures transit delays of packets on the identified paths. In a ECMP/WCMP network, a host may have to perform multiple traceroute operations if the host does not have knowledge of the ECMP/WCMP path distribution logic. The multiple traceroute operations may be performed by varying the source and/or the destination layer-4 port similar to performing a port-scan. Accordingly, in ECMP/WCMP networks, the traceroute operation must be run multiple times to identify all the potential paths that the traffic between various applications can take. An efficient mechanism for performing traceroute is required for ECMP/WCMP enabled paths.

SUMMARY

Embodiments of the present invention may identify all paths in an ECMP/WCMP enabled network without running a tracing tool multiple times.

Various embodiments may provide a computer-implemented method comprising configuring one or more devices in a network such that a software-defined network (SDN) controller receives a packet including a pre-determined option that is sent to the one or more devices. The SDN controller is provided on an electronic device. The method may include receiving the packet including the pre-determined option at the SDN controller. It may be determined that a destination of the packet is within a domain controlled by the SDN controller. The method may also include identifying one or more paths for the packet to travel on and sending the identified one or more paths to a source in the network.

In some embodiments, a computer-implemented method includes configuring one or more devices in a network such that a software-defined network (SDN) controller receives a packet including a pre-determined option that is sent to the one or more devices. The SDN controller is provided on an electronic device. The method may include receiving the packet including the pre-determined option at the SDN controller. It may be determined that a destination of the packet is outside a domain controlled by the SDN controller. The method may include identifying at least one egress switch of the domain. One or more internal paths for the packet may be identified. The one or more internal paths may connect a source of the packet to the at least one egress switch. One or more external paths for the packet may be identified. The one or more external paths may connect the at least one egress switch to the destination of the packet. The method may also include constructing one or more paths for the packet by connecting the internal one or more paths with the external one or more paths and sending the constructed one or more paths to the source of the packet.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

Exemplary embodiments described herein provide a tool that identifies available paths of an ECMP/WCMP enabled network without running a tracing tool multiple times. In various embodiments, an option may be included in a higher layer packet of a network, such as an Internet Control Message Protocol (ICMP) packet. The network may be a software-defined network (SDN) where a SDN controller (SDNC), such as an OpenFlow Controller (OFC), associated with the network may control the network devices within the network. The SDNC may be provided on an electronic device such as a computing device and/or a network device including but not limited to a server, switch, etc. SDNC may request the network devices to route any packet having the option to the SDNC. When the packet is received at the SDNC, the SDNC may check the destination address of the packet and determine whether the destination address is within the domain controlled by the SDNC, e.g. SDNC domain.

If the SDNC determines that the destination address is within the SDNC domain, SDNC may calculate the path of the packet based on the topology and the routing information of the SDNC domain. As the SDNC is associated with the network, the network topology and routing information may be readily available to the SDNC. The SDNC may generate a list of all viable paths and send the list to the source of the packet.

In some embodiments, the SDNC may run a verification process to make sure that all routes are determined. The SDNC may cache the result of the verification process for use in future queries. During the verification process, the SDNC may construct a plurality of probe packets. The SDNC may set the time-to-live (TTL) of the probe packets to prevent the probe packets from traveling outside the SDNC domain. The network may be set up such that a network element relays the received packets to the next network element and sends mirror copies of the received packets to the SDNC. Thus, the SDNC may receive mirror copies of the probe packets from the network elements. Using the mirror copies of the probe packets, SDNC may construct the path between any two network elements by stitching together paths between the network elements that each probe packet travels through.

If the SDNC determines that the destination address of the packet is outside the SDNC domain, SDNC may identify at least one egress switch of the network. SDNC may identify the ECMP paths within the SDNC domain to reach the egress switch. For the paths outside the SDNC domain, SDNC may perform conventional traceroute from the egress switch to the destination address. SDNC may stitch together the internal SDNC domain paths with the external paths to identify all the paths from the source to the destination.

Figure 1A:
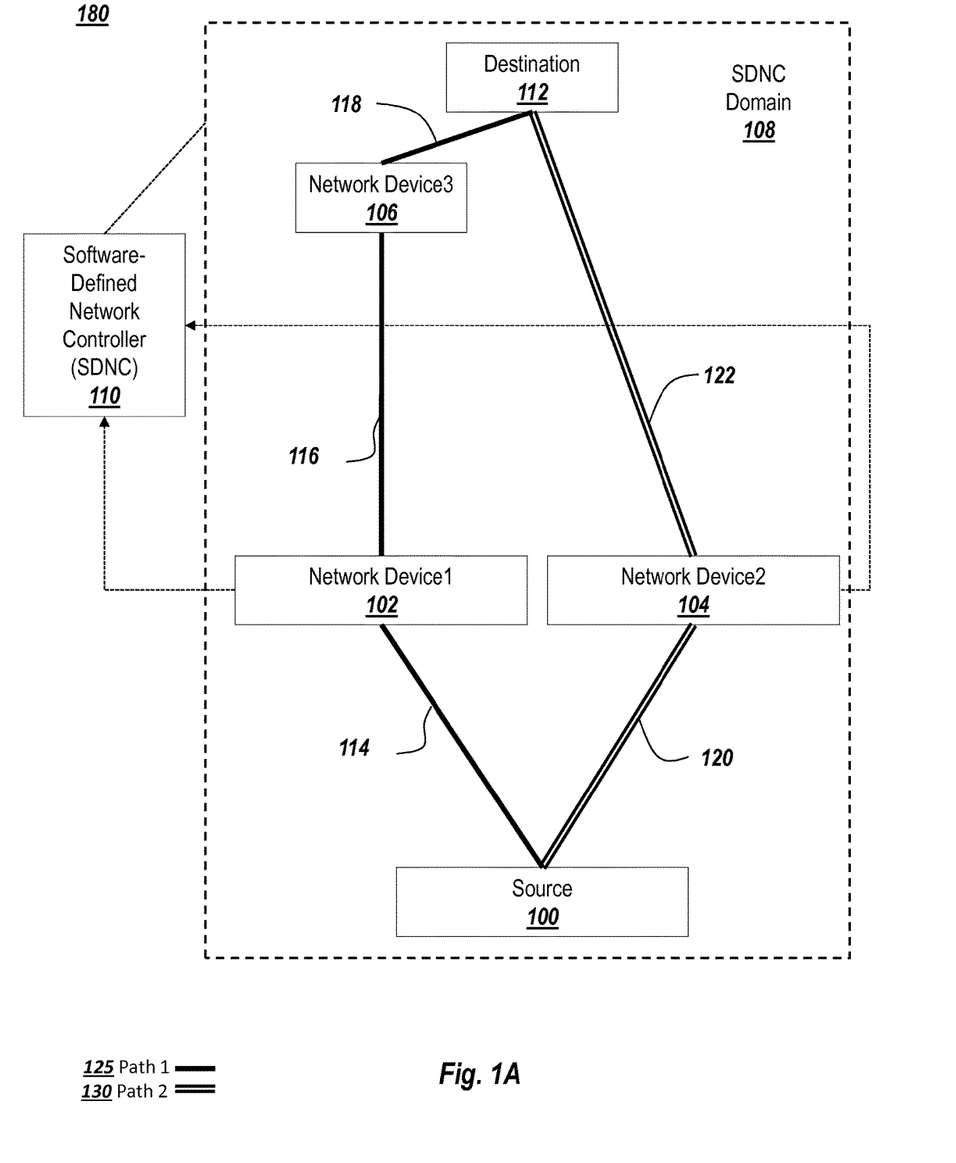
FIG. 1A depicts a Software-Defined Network Controller (SDNC) associated with a multipath network where the source and the destination are within the SDNC domain.

FIG. 1A illustrates an SDNC 110 associated with a multipath network 180. As illustrated in FIG. 1A, the entire network 180 may be within the SDNC domain 108. The network 180 may include a source 100, a destination 102 and a plurality of network devices between the source 100 and the destination 102. The plurality of network devices may include a first network device 102, a second network device 104 and a third network device 106. The plurality of network devices may include one or more of a switch, router, server, gateway, bride, hub, etc.

The source 100 and the destination 112 may be connected via multiple paths 125 and 130 that cross through the plurality of network devices. Each path 125, 130 is a vector of next-hops 114, 116, 118, 120, 122 or gateway addresses which is taken by the packet from the source 100 to reach the destination 112. One of ordinary skill in the art will appreciate that the paths 125, 130 are provided for illustration purposes only and that the network 180 may include any number of paths connecting the source 100 to the destination 112.

The source 100 may send data packets to the destination 112 using one or more of the paths 125 and 130. According to various embodiments, an option may be included in a specific packet. In some embodiments, the packet may be a higher layer packet based on IP protocol. For example, the option may be included in an ICMP packet. The use of the ICMP packet throughout the present application is for illustration purposes only and should not be construed as limiting. One of ordinary skill in the art will appreciate that a similar type of packet, such as a higher layer packet with a specific ID may be used for the purposes of the present application.

In some embodiments, the option may be called the "DISCOVER_ECMP" option. The option may be embedded in the packet along with other information such as the source IP address of the packet and the destination IP address of the packet. The source IP address is the address of the source originating the packet, and the destination IP address of the packet is the address to which all ECMP/WCMP paths will be identified. One of the embedded information in the option may be the number of paths that the source 100 requires.

According to various embodiments, the SDNC 110 may install flows in one or more of the network devices 102, 104, 106 to have the network devices 102, 104, 106 send any packet having the option, i.e. DISCOVER_ECMP, to SDNC 110. In some embodiment, the SDNC 110 may install flows by sending explicit instructions to the network devices 102, 104, 106. For example, in open-flow networks, the SDNC 110 may send an ofp_flow_mod message to the network devices 102, 104, 106. Upon receiving the instructions, the network devices 102, 104, 106 translate the instructions into relevant changes that are needed to be performed on respective hardware of network devices 102, 104, 106. When the flows are installed, the network devices 102, 104, 106 may send the packets to the SDNC 110 via the open-flow channel using a packet-in construct.

When the packets are received at the SDNC 110, SDNC 110 may analyze the destination address of the packet and determine whether the destination 112 is within the SDNC domain 108. FIG. 1A illustrates the destination 112 being within the SDNC domain 108. If the destination 112 is within the SDNC domain 108, the SDNC 110 may identify the path that the packet may take based on the topology and the routing information associated with the network 180. If the portion of the network 180 including the destination 112 and the source 100 are within the SDNC domain 108, the topology and the routing information of the portion of the network 180 may be readily available, i.e. known by, the SDNC 110. Alternatively, SDNC 110 may gather the topology and the routing information by consulting flow table entries of the network devices 102, 104, 106 that exist on the path between the destination 112 and the ingress switch, i.e. the switch which sent the packet to SDNC 110.

Based on the topology and the routing information, SDNC 110 may identify the paths 125, 130 that the packet might take. SDNC 110 may send a list of the identified paths to the source 100 by injecting a reply packet, e.g. the DISCOVER_ECMP_REPLY packet, in the network 180. The SDNC 110 may inject the reply packet via a packet-out construct of the openflow protocol.

In some embodiments, SDNC 110 may perform a verification process to ensure that all the flow paths the packet may travel in the network 180 are identified. The verification process may be performed periodically or on an on-demand basis. Upon performing the verification process, the SDNC 110 may cache the verification results. The cached results may be used in responding to the DISCOVER_ECMP probes from the source 100 and/or the destination 112. The verification process is discussed below in further detail in connection with FIG. 3.

According to various embodiments, the source 100 may request a maximum number of paths in a packet. If the source 100 has requested a maximum number of paths (k) in the packet, the SDNC 110 will only enumerate at most k minimum cost paths from source 100 to destination 112. That is, even if SDNC 110 has identified more than (k) paths between the source 100 and the destination 112, only (k) paths may be included in the DISCOVER_ECMP_REPLY packet sent to the source 100. In some embodiments, SDNC 110 can exploit the conventional Eppstein algorithm to find k-shortest paths in a graph.

Figure 1B:
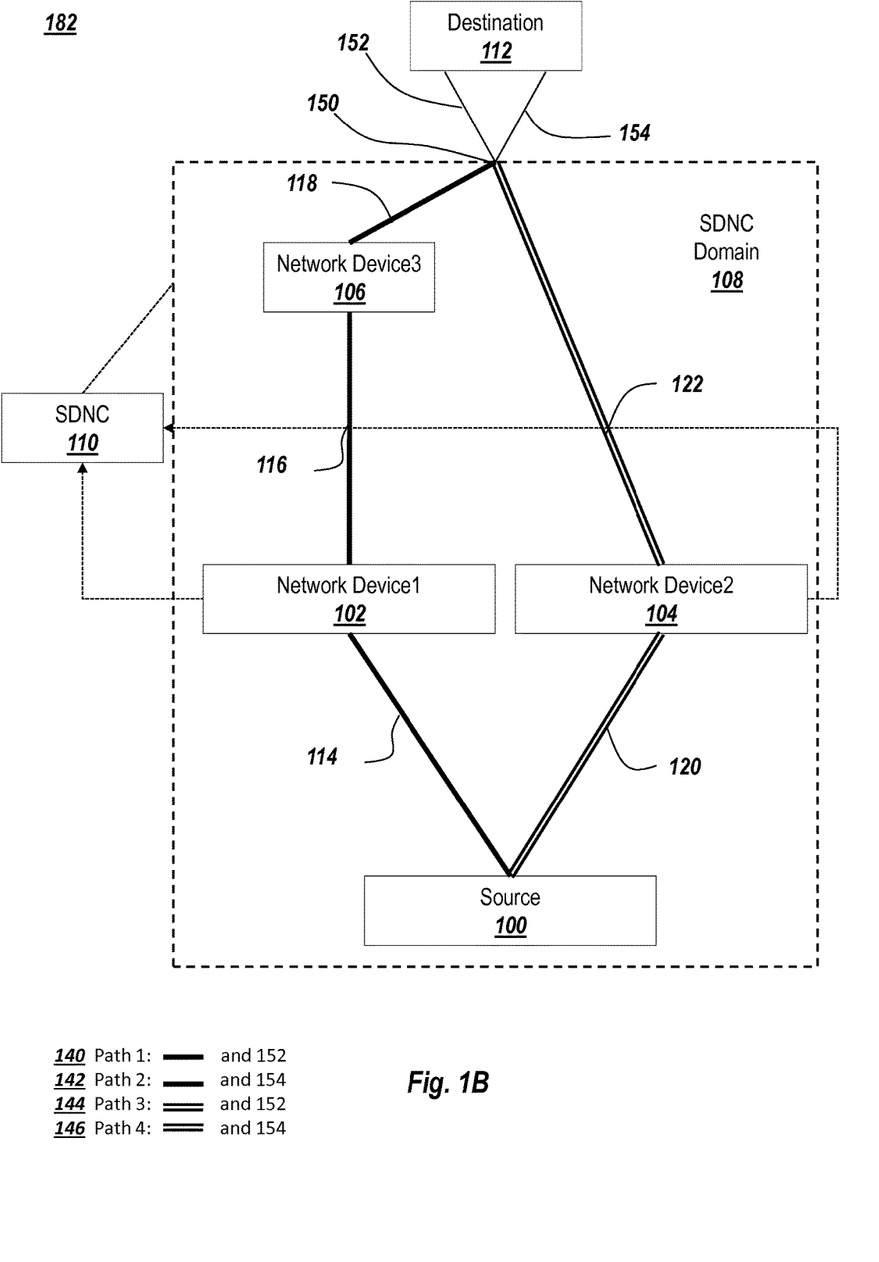
FIG. 1B depicts a SDNC associated with a multipath network where the source is within the SDNC domain and the destination is outside the SDNC domain.

In some embodiments, the destination 112 may be outside the SDNC domain 108. FIG. 1B illustrates a network 182 where the destination 112 is outside the SDNC domain 108. If the destination 112 is outside the SDNC domain 108, the SDNC 110 may determine at least one egress switch 150 of the SDNC domain 108 to reach the destination 112. SDNC 110 may create the ECMP path within the SDNC domain to reach the egress switch 150 as discussed above in connection with FIG. 1A. For example, the SDNC 110 may determine a first path as vector of next-hops 114, 116 and 118 as well as a second path as a vector of next-hops 120 and 122.

Once the paths internal to the SDNC domain 108 are identified, the SDNC 110 may identify the paths connecting the egress switch 150 to the destination 112. That is, the SDNC 110 may identify the paths external to the SDNC domain 108. The SDNC 110 may perform a proxy ECMP_DISCOVERY to the destination 112 from the egress switch 150 to identify the external paths 152, 153 from the egress switch 150 to the destination 112. SDNC 110 may perform the proxy discovery either by (1) performing proxy discovery by using the edge switch 152 as a source and destination of the original ECMP_DISCOVERY packet; or (2) performing a traditional traceroute from the edge switch 152 to the destination 112 of the original ECMP_DISCOVERY packet.

Upon identifying the internal paths and the external paths, SDNC 110 may stitch together the internal paths with the external paths and return the result to the source 100. As a result, in FIG. 1B, the following four paths may be identified: the first path may be identified as vector of next-hops 114, 116, 118 and 152; the second path may be identified as vector of next-hops 114, 116, 118 and 154; the third path may be identified as vector of next-hops 120, 122 and 152 and the fourth path may be identified as vector of next-hops 120, 1222 and 154.

In some embodiments, a path encoding scheme may be implemented to avoid multiplicative explosion of paths. For example, according to an exemplary path encoding scheme, each path vector may be identified by a unique number, e.g. "path-ID". Each path vector may also have a list of gateway IPs that a packet must traverse. To join path vectors, a path vector may have path-IDs instead of gateway IPs as a list members. An exemplary encoding scheme may include two paths: the first path comprising the nodes n1-n2-n3-n4-n5 and the second path comprising the nodes n1-n2-n3-n6-n5. Instead of listing all the nodes in various paths, a common path can be defined to represent the common nodes in the first path and the second path. For example, the common path may be represented as p1=n1-n2-n3. Accordingly, the first path may then be defined as p1-n4-n5 and the second path may be defined as p1-n6-n5. Alternatively, a tree of paths may be built as follows:

The leaf nodes in the tree (not shown) may correspond to the destination n5.

Figure 2:
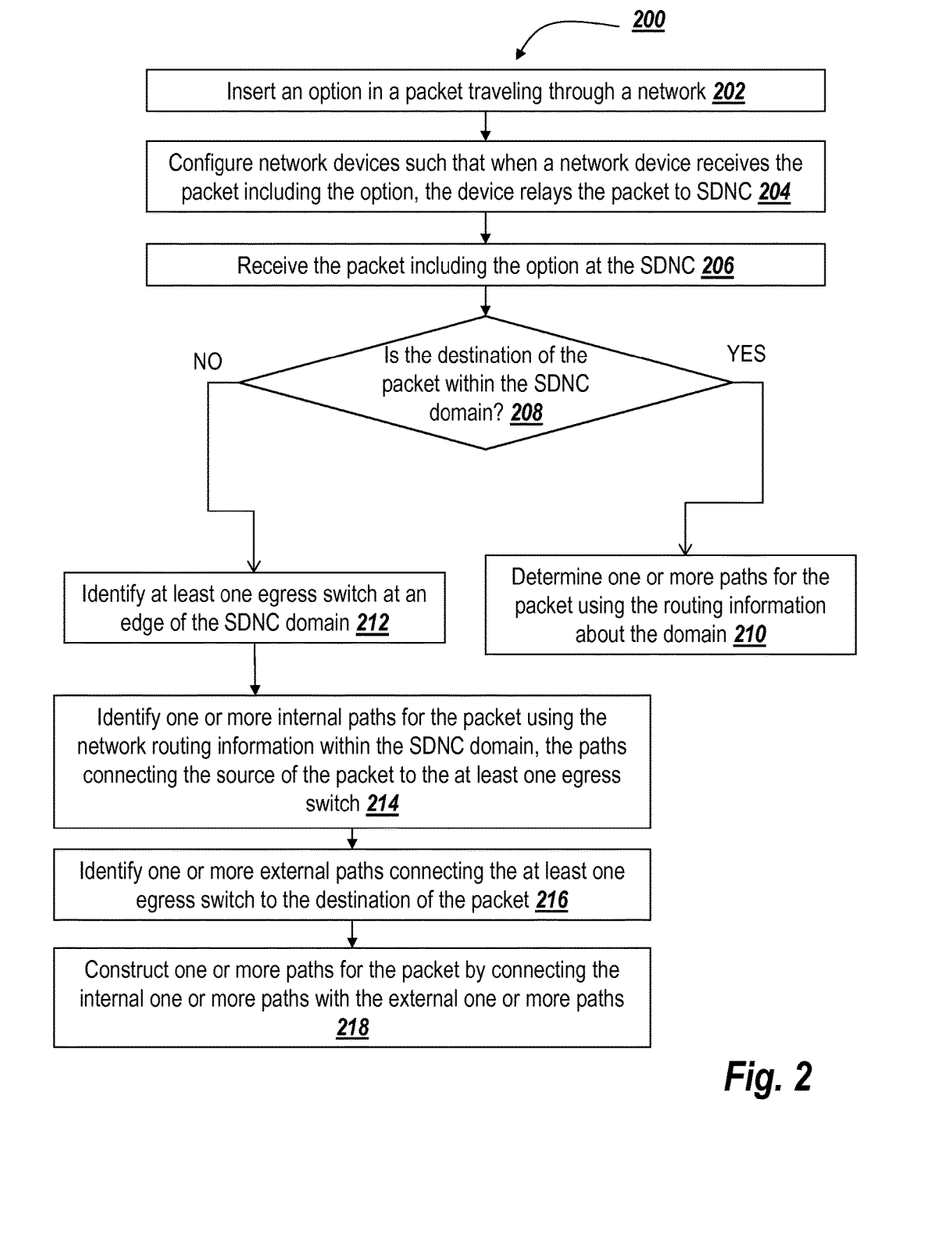
FIG. 2 is a flowchart describing steps taken by a SDNC to identify paths in a multipath network.

FIG. 2 illustrates a flowchart 200 describing steps taken by the SDNC to identify all paths in a multipath network. At step 202, SDNC inserts an option in a packet traveling through the network. At step 204, SDNC may configure the network devices in the network to send packets to the SDNC upon receipt. That is, when a network device receives a packet, the network device may send the packet to the SDNC. Accordingly, when the devices receive the packet including the option, the devices will send the packet to the SDNC. At step 206, SDNC receives the packet including the option. Upon receipt of the packet with the option, SDNC determines whether the destination of the packet is within the SDNC domain (step 208).

If it is determined that the destination is within the SDNC domain (YES to step 208), the SDNC determines the one or more paths for the packet using the routing information of the network within the SDNC domain (step 210). The routing information of the network may be readily available to the SDNC as the portion of the network between the source and the destination is within the SDNC domain.

If it is determined that the destination is outside the SDNC domain (NO to step 208), the SDNC identifies at least one egress switch at an edge of the SDNC domain (step 212). The identification of the paths may be a three-step process. First, the SDNC may identify the internal portion of the paths that remain within the SDNC domain, i.e. the paths that connect the source to the identified egress switch(es). Specifically, at step 214, the SDNC may identify one or more internal paths for the packet using the network routing information within the SDNC domain. Second, the SDNC may identify the external portion of the paths that remain outside the SDNC domain, the paths that connect the identified egress switch(es) to the destination. Specifically, at step 216, the SDNC may identify one or more external paths connecting the at least one egress switch to the destination of the packet. Third, at step 218, the SDNC may construct one or more paths for the packet from the source to the destination by connecting, i.e. stitching together, the internal one or more paths (identified at step 214) with the external one or more paths (identified at step 216).

As provided above, the SDNC may perform a verification process to ensure that all internal paths, i.e. those that remain inside the SDNC domain, are identified. For the purpose of verification, SDNC may construct one or more probe packets. In some embodiments, the probe packets may match a particular flow entry in the network devices. For example, probe packets may carry a payload as 0x0A0B0C0D repeated few times. The flow entry on the network device may have a match criteria to detect when a pay load starts with 0x0A0B0C0D and is repeated a pre-determined number of times. When the match criteria is satisfied, the network device may perform various actions like re-directing the packet to the controller, rate-limiting the packet, etc.

During the verification process, each of the network devices may perform regular forwarding in addition to forwarding a mirror copy of the received packets to the SDNC. Thus, when SDNC injects the probe packet, the probe packet will travel through the network devices and each network device will send a mirror copy of the probe packet to the SDNC. Based on the received mirror copies, the SDNC may stitch the paths that the probe packet must have taken. The SDNC may compare the stitched paths to the identified paths for verification purposes. In some embodiments, the SDNC may set TTL field of the probe packet to ensure that the probe packet does not travel beyond the SDNC domain. The SDNC may rotate the source and destination layer-4 port of the probe packet to ensure that each probe packet instance takes an alternate path in multipath network.

According to various embodiments, the result of the verification process may be cached at the SDNC using an aging mechanism. The SDNC may send and trace multiple simultaneous probe packets to different destinations. In order to keep track of multiple probe packets, the SDNC may embed unique cookie fields in the payload of the probe packets. Thus, when the mirror copies of the probe packets are returned, the SDNC may easily correlate the probe sequence and the intermediate points which originated the mirror copies to form the full path.

Figure 3:
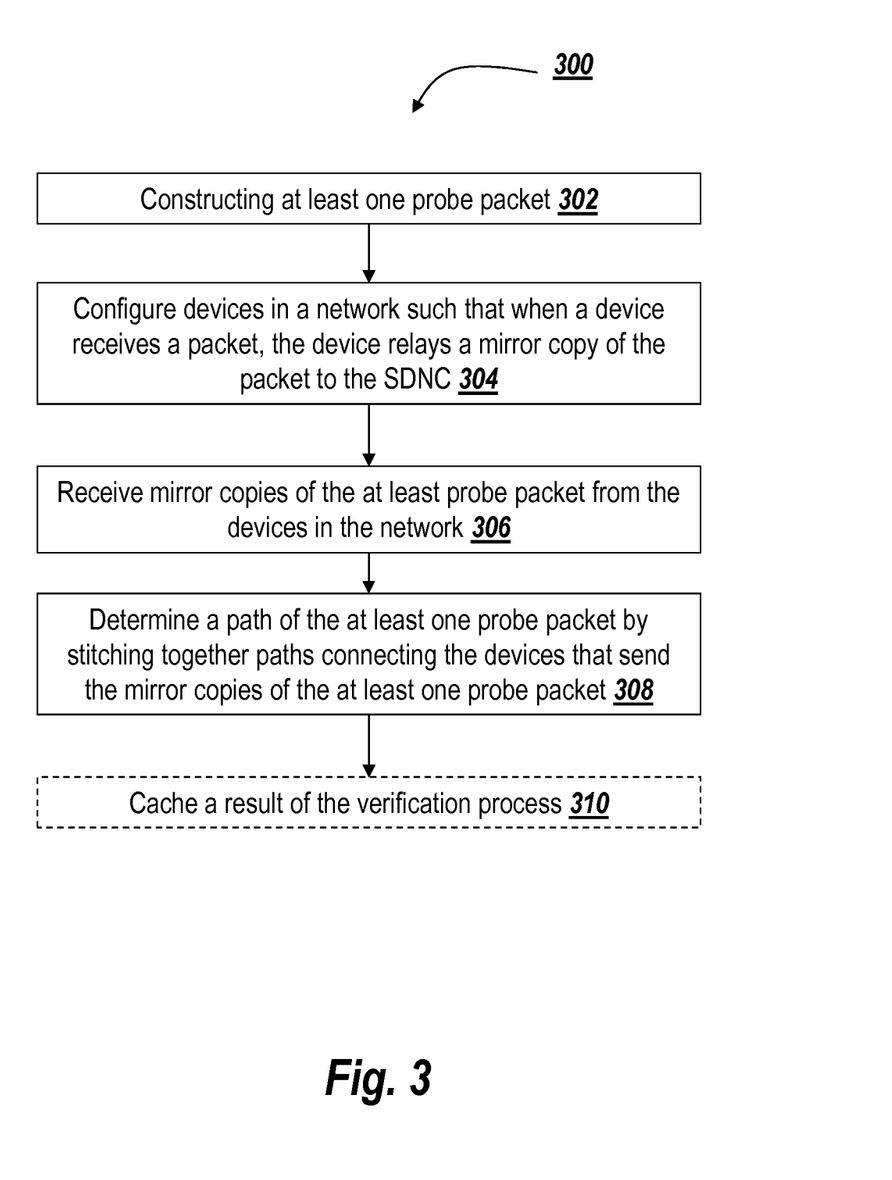
FIG. 3 is a flowchart describing steps taken by a SDNC to perform an exemplary verification process.

FIG. 3 illustrates a flowchart describing steps taken by the SDNC to perform an exemplary verification process. At step 302, the SDNC constructs at least one probe packet. At step 304, SDNC configures the network devices such that when a network device receives a packet, the network device transmits the packet according to regular forwarding rules in addition to sending a mirror copy of the packet to the SDNC. At step 306, the SDNC receives mirror copies of the at least one probe packet from the network devices. Using the received mirror copies, the SDNC may determine a path of the at lest one probe packet though the network by stitching together the paths connecting the network devices sending the mirror copies. In some embodiments, the SDNC may optionally cache a result of the verification process for future use (step 310).

One or more of the above-described acts may be encoded as computer-executable instructions executable by processing logic. The computer-executable instructions may be stored on one or more non-transitory computer readable media. One or more of the above described acts may be performed in a suitably-programmed electronic device.

Figure 4:
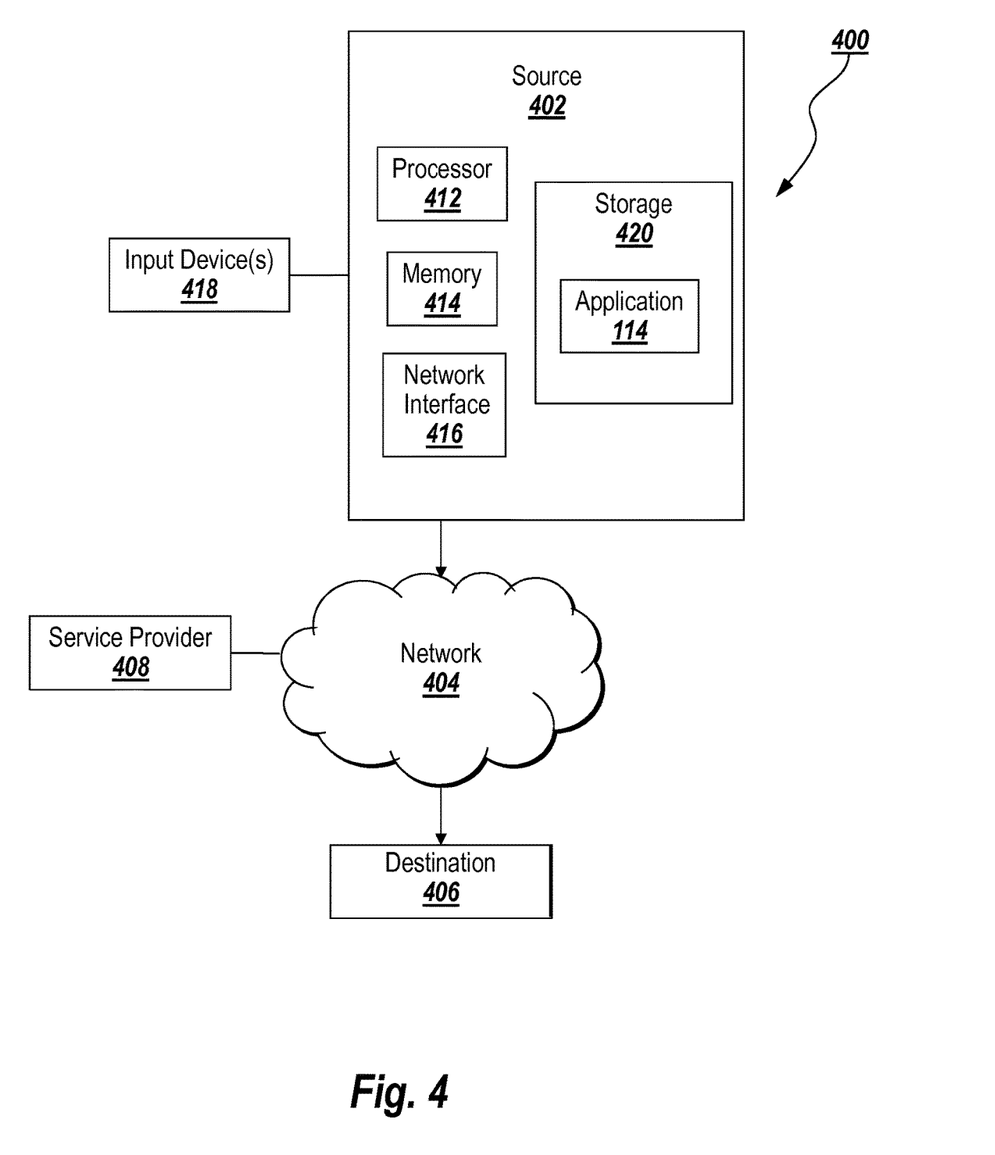
FIG. 4 depicts an exemplary computing device suitable for use with exemplary embodiments described herein.

FIG. 4 illustrates a communication system 400 for conveying a data packet from a source 402 to a specific destination 406 according to the teachings of the present invention. The illustrated system 400 can include any conventional arrangement of networking components, and according to one embodiment, can include a source 402 that is coupled to and otherwise communicates with an overall network 404. The network 404 in turn is coupled to a destination 406. The embodiment of FIG. 4 is exemplary, and other embodiments can include more devices, fewer devices, or devices in arrangements that differ from the arrangement of FIG. 4.

The source 402 can be any suitable electronic device and can take many forms, including but not limited to a computer, workstation, server, network computer, quantum computer, optical computer, Internet appliance, mobile device, a pager, a tablet computer, a smart sensor, application specific processing device, and the like. The source 402 as illustrated herein is merely illustrative and may take other forms.

The source 402 may also include selected components for generating and/or forwarding data packets. The components may be implemented using hardware based logic, software based logic and/or logic that is a combination of hardware and software based logic (e.g., hybrid logic). The source 402 may include a processor 412 that can include logic that can interpret, execute, and/or otherwise process information contained in, for example, a memory element 414. The information may include computer-executable instructions and/or data that may be implemented by or in one or more embodiments of the present invention. The processor 412 may comprise a variety of homogeneous or heterogeneous hardware. The hardware may include, for example, some combination of one or more processors, microprocessors, field programmable gate arrays (FPGAs), application specific instruction set processors (ASIPs), application specific integrated circuits (ASICs), complex programmable logic devices (CPLDs), graphics processing units (GPUs), or other types of processing logic that may interpret, execute, manipulate, and/or otherwise process the information. The processor 402 may include a single core or multiple cores. Moreover, the processor 402 may include a system-on-chip (SoC) or system-in-package (SiP) design.

The source 402 may also include one or more tangible non-transitory computer-readable storage media for storing one or more computer-executable instructions or software that may be implemented by or in one or more embodiments of the present invention. The non-transitory computer-readable storage media may be, for example, a memory 414 or storage element. The memory 414 may comprise a ternary content addressable memory (TCAM) and/or a RAM that may include RAM devices that may store the information. The RAM devices may be volatile or non-volatile and may include, for example, one or more DRAM devices, flash memory devices, SRAM devices, zero-capacitor RAM (ZRAM) devices, twin transistor RAM (TTRAM) devices, read-only memory (ROM) devices, ferroelectric RAM (FeRAM) devices, magneto-resistive RAM (MRAM) devices, phase change memory RAM (PRAM) devices, memristors, or other types of RAM devices.

The source 402 may also be a virtual machine (VM) for executing instructions loaded in the memory 414. The virtual machine may be provided to handle a process running on multiple processors so that the process may appear to be using only one computing resource rather than multiple computing resources. Virtualization may be employed in the source 402 so that infrastructure and resources in the source 402 may be shared dynamically. Multiple VMs may be resident on a single client device.

The source 402 may also include a network interface 416 so as to be able to interface to the network 404. The network 404 can be a Local Area Network (LAN), Wide Area Network (WAN) or the Internet through a variety of connections including, but not limited to, standard telephone lines, LAN or WAN links (e.g., T1, T3, 56 kb, X.25), broadband connections (e.g., integrated services digital network (ISDN), Frame Relay, asynchronous transfer mode (ATM), wireless connections (e.g., 802.11), high-speed interconnects (e.g., InfiniB and, gigabit Ethernet, Myrinet) or some combination of any or all of the above. The network interface 416 may include a built-in network adapter, network interface card, personal computer memory card international association (PCMCIA) network card, card bus network adapter, wireless network adapter, universal serial bus (USB) network adapter, modem or any other device suitable for interfacing the client device to any type of network 404 capable of communication and performing the operations described herein.

The source 402 may also be coupled to one or more input devices 418, such as a keyboard, a multi-point touch interface, a pointing device (e.g., a mouse), a gyroscope, an accelerometer, a haptic device, a tactile device, a neural device, a microphone, or a camera that may be used to receive input from, for example, a user. The source 402 may also include other suitable I/O peripherals.

A storage device 420 may also be associated with the source 402 or with any other system component. The storage device 420 may be accessible to the processor via an I/O bus. The information may be executed, interpreted, manipulated, and/or otherwise processed by the processor 412. The term storage device 420 as used herein for example with the source 402 or any other system component may include, for example, a storage device, such as a magnetic disk, optical disk (e.g., CD-ROM, DVD player), random-access memory (RAM) disk, tape unit, and/or flash drive. The information may be stored on one or more non-transient tangible computer-readable media contained in the storage device 420. This media may include, for example, magnetic discs, optical discs, magnetic tape, and/or memory devices (e.g., flash memory devices, static RAM (SRAM) devices, dynamic RAM (DRAM) devices, or other memory devices). The information may include data and/or computer-executable instructions that may implement one or more embodiments of the present application.

The storage device 420 may further store application(s) 114, and the source 402 can be running an operating system (OS). Examples of suitable operating systems may include the Microsoft® Windows® operating systems, the Unix and Linux operating systems, the MacOS® for Macintosh computers, an embedded operating system, such as the Symbian OS, a real-time operating system, an open source operating system, a proprietary operating system, operating systems for mobile electronic devices, or other operating system capable of running on the electronic device and performing the operations described herein. The operating system may be running in native mode or emulated mode.

The storage device 420 may further include rules which describe how messages should be forwarded over a communications system. The rules may be used to forward messages or information received at the source 402. Accordingly, the source 402 may serve as a forwarding device, switch, or router.

The storage device 420 may include logic for implementing one or more selected communication protocols. The communication protocol may be a protocol which provides an interface for accessing and modifying the functionality of the forwarding plane of the client device.

One or more embodiments of the present invention may be implemented using computer-executable instructions and/or data that may be embodied on one or more non-transitory tangible computer-readable mediums. The mediums may be, but are not limited to, a hard disk, a compact disc, a digital versatile disc, a flash memory card, a Programmable Read Only Memory (PROM), a Random Access Memory (RAM), a Read Only Memory (ROM), Magnetoresistive Random Access Memory (MRAM), a magnetic tape, or other computer-readable media.

FIG. 4 also illustrates the network 404 suitable for implementing one or more embodiments of the present invention. The network 404 is merely exemplary, and other embodiments can include more devices, fewer devices, or devices in arrangements that differ from the arrangement of FIG. 4.

The illustrated network 404 may transport data from a source (e.g., source 402) to a destination (e.g., destination 406). The network 404 may employ any selected combination or arrangements of network devices, such as routers, switches, firewalls, and/or servers and connections (e.g., links) (not shown) to transport data. Data may refer to any type of machine-readable information having substantially any format that may be adapted for use in one or more networks and/or with one or more devices described herein. Data may include digital information or analog information. The data may be packetized and/or non-packetized, although the present invention assumes the use of packetized data.

The network 404 may be a hardwired network using wired conductors and/or optical fibers and/or may be a wireless network using free-space optical, radio frequency (RF), and/or acoustic transmission paths. In one implementation, the network 404 may be a substantially open public network, such as the Internet. In another implementation, the network 404 may be a more restricted network, such as a corporate virtual network. The network 404 may include the Internet, intranet, Local Area Network (LAN), Wide Area Network (WAN), Metropolitan Area Network (MAN), wireless network (e.g., using IEEE 802.11), or other type of network. The network 712 may use middleware, such as Common Object Request Broker Architecture (CORBA) or Distributed Component Object Model (DCOM). Implementations of networks and/or devices operating on networks described herein are not limited to, for example, any particular data type, protocol, and/or architecture/configuration.

The system 400 can also include a service provider 408 that makes a service available to another component of the system. For example, the service provider 408 may include an entity (e.g., an individual, a corporation, an educational institution, a government agency, etc.) that provides one or more services to a destination using a server and/or other devices. Services may include instructions that are executed by a destination to perform an operation (e.g., an optimization operation). Alternatively, a service may include instructions that are executed on behalf of a destination to perform an operation on the destination's behalf.

The system 400 also includes the destination 406. The destination 406 may include a device that receives information over the network 404. For example, the destination 406 may be a device that receives data from the source 402. Those of ordinary skill will readily recognize that the system 400 may employ any suitable number of servers.

The foregoing description may provide illustration and description of various embodiments of the invention, but is not intended to be exhaustive or to limit the invention to the precise form disclosed. Modifications and variations may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware.

Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such.

Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless stated otherwise. The conjunction "or" is meant to be inclusive, unless stated otherwise.

It is intended that the invention not be limited to the particular embodiments disclosed above, but that the invention will include any and all particular embodiments and equivalents falling within the scope of the following appended claims.

The invention claimed is:

1. A computer implemented method, comprising:
configuring one or more devices in a network to route an Internet Control Message Protocol ("ICMP") packet that includes a source address, a destination address and an option to a software-defined network ("SDN") controller based on the inclusion of the option in the ICMP packet,
wherein the SDN controller is provided on an electronic device and the option indicates, to the SDN controller, a request to discover multiple routes from a source address to a destination address indicated by the packet under at least one of an equal-cost multi-path ("ECMP") or a weighted-cost multi-path ("WCMP") routing strategy;

receiving the packet including the option at the SDN controller;

determining that the destination address indicated by the packet is within a domain controlled by the SDN controller;

identifying one or more paths between the source address and the destination address indicated by the packet; and sending the identified one or more paths to the source address indicated by the packet via the network.

2. The method of claim 1, further comprising:

generating a list including the identified one or more paths; and sending the list to the source address indicated by the packet.

3. The method of claim 1, further comprising:

running a verification process to verify that all paths between the source address and the destination address are identified.

4. The method of claim 3, the verification process comprising:

constructing at least one probe packet, configuring the one or more devices in the network to send a mirror copy of the at least one probe packet to the SDN controller responsive to receiving the at least one probe packet, receiving the mirror copy of the at least one probe packet from the one or more devices in the network, and determining one or more paths of the at least one probe packet by stitching together a plurality of routes connecting the one or more devices that send the mirror copy of the at least one probe packet.

5. The method of claim 4, further comprising:

comparing the one or more determined paths to the one or more identified paths to ensure that all viable paths between the source and the destination are identified.

6. The method of claim 4, further comprising:

caching a result of the verification process.

7. The method of claim 1 further comprising:

inserting the option in the packet prior to the configuring the one or more devices.

8. The method of claim 1, wherein the one or more paths are identified using routing information about the domain.

9. A computer-implemented method comprising:

configuring one or more devices in a network to route an Internet Control Message Protocol ("ICMP") packet that includes a source address, a destination address and an option to a software-defined network ("SDN") controller based on the inclusion of the option in the ICMP packet, wherein the SDN controller is provided on an electronic device and the option indicates, to the SDN controller, a request to discover multiple routes from a source address to a destination address indicated by the packet under at least one of an equal-cost multi-path ("ECMP") or a weighted-cost multi-path ("WCMP") routing strategy;

receiving the packet including the option at the SDN controller;

determining that the destination address indicated by the packet is outside a domain controlled by the SDN controller;

identifying at least one egress switch of the domain;

identifying one or more internal paths that connect the source address indicated by the packet to the at least one egress switch;

identifying one or more external paths that connect the at least one egress switch to the destination address indicated by the packet;

constructing one or more paths for the packet by connecting the internal one or more paths with the external one or more paths; and sending the constructed one or more paths to the source address indicated by the packet via the network.

10. The method of claim 9, wherein the one or more external paths are determined using a traceroute algorithm.

11. The method of claim 9, further comprising:

generating a list including the constructed one or more paths; and sending the list to the source address indicated by the packet.

12. The method of claim 9, further comprising:

running a verification process to verify that all the more paths for the packet are constructed, the verification process comprising:

constructing at least one probe packet, configuring the one or more devices in the network to send a mirror copy of the at least one probe packet to the SDN controller responsive to receiving the at least one probe packet, receiving the mirror copy of the at least one probe packet from the one or more devices in the network, and determining one or more paths of the at least one probe packet by stitching together a plurality of routes connecting the one or more devices that send the mirror copy of the at least one probe packet.

13. The method of claim 12, further comprising:

comparing the one or more determined paths to the one or more identified internal paths to ensure that all viable internal paths between the source and the destination are identified.

14. The method of claim 12, further comprising:

caching a result of the verification process.

15. The method of claim 9, further comprising:

inserting the option in the packet prior to the configuring the one or more devices.

16. The method of claim 9, wherein the one or more internal paths are identified using routing information about the domain.

17. The method of claim 1, the method further comprising:

gathering, by the SDN controller, topology and routing information from flow table entries of at least one of the one or more devices; and identifying, by the SDN controller, the one or more paths based on the gathered topology and routing information.

18. The method of claim 9, the method further comprising:

gathering, by the SDN controller, topology and routing information from flow table entries of at least one of the one or more devices; and identifying, by the SDN controller, the one or more internal paths based on the gathered topology and routing information.

* * * * *